(12) United States Patent
Lee

(10) Patent No.: US 12,018,723 B2
(45) Date of Patent: Jun. 25, 2024

(54) WHEEL BEARING

(71) Applicant: ILJIN GLOBAL Co., Ltd, Seoul (KR)

(72) Inventor: In Ha Lee, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 295 days.

(21) Appl. No.: 17/497,260

(22) Filed: Oct. 8, 2021

(65) Prior Publication Data

US 2022/0025930 A1 Jan. 27, 2022

Related U.S. Application Data

(63) Continuation of application No. PCT/KR2019/004307, filed on Apr. 10, 2019.

(51) Int. Cl.
*F16C 33/76* (2006.01)
*B60B 27/00* (2006.01)
*F16C 19/18* (2006.01)
*F16C 33/78* (2006.01)

(52) U.S. Cl.
CPC ........ *F16C 33/768* (2013.01); *B60B 27/0073* (2013.01); *F16C 19/183* (2013.01); *F16C 33/7816* (2013.01); *F16C 2326/02* (2013.01)

(58) Field of Classification Search
CPC .. F16C 19/183; F16C 19/186; F16C 33/7816; F16C 33/768; F16C 33/782; F16C 33/7823; F16C 33/7869; F16C 33/7883; F16C 33/7886; F16C 33/7896; F16C 2326/02; B60B 27/0036; B60B 27/0073; B60B 35/14; B60B 35/18
See application file for complete search history.

(56) References Cited

U.S. PATENT DOCUMENTS

| 2013/0001888 A1* | 1/2013 | Rossi | F16J 15/3256 |
| | | | 277/549 |
| 2013/0283954 A1* | 10/2013 | Niebling | F16C 33/768 |
| | | | 384/514 |
| 2014/0374996 A1* | 12/2014 | Duch | F16C 33/7883 |
| | | | 277/562 |

FOREIGN PATENT DOCUMENTS

| DE | 102012207054 A1 * | 10/2013 | ........... B60B 27/001 |
| JP | 2004345370 A | 12/2004 | |
| JP | 3869204 B2 | 1/2007 | |
| JP | 2009024770 A | 2/2009 | |

(Continued)

OTHER PUBLICATIONS

International Search Report of PCT/KR2019/004307 dated Jan. 9, 2020.

*Primary Examiner* — Alan B Waits
(74) *Attorney, Agent, or Firm* — Dinsmore & Shohl LLP; Yongsok Choi, Esq.

(57) ABSTRACT

A wheel bearing includes a first seal member disposed between an outer ring and a first outer peripheral surface of a first cylindrical portion of an inner ring and configured to seal between the outer ring and the inner ring; and a second seal member press-fitted to a second cylindrical portion of the inner ring. The second seal member includes a slinger comprising an outer axial end portion spaced apart from the first seal member and a first end surface of the inner ring; a first seal lip coupled to the outer axial end portion of the slinger and comprising a first seal portion in contact with a portion of the first seal member and a second seal portion in contact with a portion of the first cylindrical portion; and a second seal lip coupled to the slinger so as to be spaced apart from the first seal lip.

13 Claims, 6 Drawing Sheets

(56) References Cited

FOREIGN PATENT DOCUMENTS

| JP | 4274738 B2 | 6/2009 |
| KR | 1020110027697 A | 3/2011 |
| KR | 1020190096736 A | 8/2019 |

\* cited by examiner

WHEEL BEARING

CROSS-REFERENCE TO RELATED APPLICATIONS

This application is a continuation of International Application No. PCT/KR2019/004307 filed on Apr. 10, 2019, the entire contents of which are herein incorporated by reference.

TECHNICAL FIELD

The present disclosure relates to a wheel bearing.

BACKGROUND ART

A chassis of a vehicle comprises a wheel bearing coupled to a wheel of a vehicle. The wheel bearing may comprise an outer ring coupled to a portion of the chassis, an inner ring rotating relative to the outer ring and coupled to a wheel hub, and a plurality of rolling elements arranged between the outer ring and the wheel hub. The wheel is coupled to the outside of the wheel hub and a constant velocity joint is coupled to the inside of the wheel hub. The inner ring may be coupled to the wheel hub by the orbitally forming of an inner end portion of the wheel hub in a state in which the inner ring is press-fitted to the wheel hub. The wheel hub is configured to rotate relative to the outer ring together with the inner ring, the wheel and the constant velocity joint. Due to the use environment of the wheel bearing, foreign matters such as rainwater and muddy water may enter between the wheel hub and the constant velocity joint. Particularly, such foreign matters may have a significant effect when the wheel hub and the constant velocity joint are face spline-coupled. Seal devices have been developed to prevent foreign matters from entering between the wheel hub and the constant velocity joint.

SUMMARY

Technical Problem

However, these seal devices are configured to be mounted on the inner ring or the constant velocity joint to seal between the wheel hub and the constant velocity joint, or are configured to be integrally formed with a seal device between the inner ring and the outer ring. When the seal device is mounted on the inner ring or the constant velocity joint, the seal device cannot effectively prevent the inner ring from being exposed to the external environment. The inner ring has hoof stress caused due to the orbital forming. Here, the hoof stress refers to a normal stress acting in a circumferential direction on a cylinder portion or the like which is subjected to internal pressure. When the inner ring is exposed to the external environment and is in contact with foreign matters while being under the hoof stress, not only corrosion but also stress corrosion cracks (SCC) may occur in the inner ring, which may reduce the performance and the durability of the wheel bearing.

Further, when the seal device is configured to be integrally formed with the seal device between the inner ring and the outer ring, producing of the seal device becomes difficult and the producing costs increase.

An object of the present disclosure is to solve the problems in the related art described above and is to provide a wheel bearing capable of sealing between a wheel hub and a constant velocity joint and sealing an inner ring so that the inner ring is not exposed to the external environment.

Technical Solution

Embodiments according to an aspect of the present disclosure relate to a wheel bearing. A wheel bearing according to an exemplary embodiment comprises: an outer ring coupled to a vehicle body; a wheel hub to which a wheel is coupled, in which an orbital forming portion is formed at an end portion thereof in an inner axial direction, and in which face splines are formed at an inner axial end portion of the orbital forming portion; an inner ring which is coupled to an outer peripheral surface of the wheel hub by the orbital forming portion to rotate relative to the outer ring, and which comprises a first cylindrical portion comprising a first outer peripheral surface and a first end surface formed in the inner axial direction and a second cylindrical portion having a diameter smaller than that of the first cylindrical portion, having a second outer peripheral surface and a second end surface formed in the inner axial direction, and extending from the first end surface in the inner axial direction; a first seal member disposed between the outer ring and the first outer peripheral surface of the first cylindrical portion and configured to seal between the outer ring and the inner ring; and a second seal member press-fitted to the second cylindrical portion. The second seal member comprises: a slinger having an outer axial end portion spaced apart from the first seal member and the first end surface; a first seal lip coupled to the outer axial end portion of the slinger and comprising a first seal portion in contact with a portion of the first seal member and a second seal portion in contact with a portion of the first cylindrical portion; and a second seal lip coupled to the slinger so as to be spaced apart from the first seal lip in the inner axial direction.

In an embodiment, the first seal member may comprise: an inner peripheral surface disposed on a first outer peripheral surface of the first cylindrical portion; an end surface formed in the inner axial direction; and a corner surface disposed between the inner peripheral surface of the first seal member and the end surface of the first seal member. The first seal portion may be in contact with at least one of the inner peripheral surface of the first seal member, the end surface of the first seal member, and the corner surface of the first seal member.

In an embodiment, the second seal portion may be in contact with at least one of the first outer peripheral surface of the first cylindrical portion, the first end surface of the first cylindrical portion, and a corner surface disposed between the first outer peripheral surface of the first cylindrical portion and the first end surface of the first cylindrical portion.

In an embodiment, the first seal member may comprise: an outer frame coupled to the outer ring; an inner frame coupled to the first cylindrical portion of the inner ring so as to be spaced apart from the outer frame in the inner axial direction; and an outer seal lip coupled to the outer frame and in contact with the inner frame.

In an embodiment, the inner frame may comprise an inner peripheral surface in contact with the first outer peripheral surface of the first cylindrical portion; an end surface formed in the inner axial direction; and a corner surface disposed between the inner peripheral surface of the inner frame and the end surface of the inner frame. The first seal portion may be in contact with the end surface of the inner frame or the corner surface of the inner frame.

In an embodiment, the first seal member may further comprise an encoder coupled in the inner axial direction of the inner frame.

In an embodiment, the encoder may comprise an inner peripheral surface spaced apart from the first outer peripheral surface of the first cylindrical portion in an outer radial direction; an end surface formed in the inner axial direction; and a corner surface disposed between the inner peripheral surface of the encoder and the end surface of the encoder. The first seal portion may be in contact with at least one of the inner peripheral surface of the encoder, the end surface of the encoder, and the corner surface of the encoder.

In an embodiment, a concave portion may be formed in the inner peripheral surface of the first seal lip so that the first seal lip is in elastic contact with the first seal member and the first cylindrical portion.

In an embodiment, the slinger may be press-fitted to the second cylindrical portion and may be space apart from the orbital forming portion.

In an embodiment, the slinger may comprise: a first slinger comprising a slinger end surface formed in the inner axial direction and press-fitted to the second cylindrical portion; and a second slinger having a diameter smaller than that of the first slinger and extending from the slinger end surface in the inner axial direction.

In an embodiment, the second slinger may be spaced apart from the orbital forming portion in the outer radial direction.

In an embodiment, the second seal lip may be coupled to the second slinger and may comprise a protrusion which further protrudes in the inner radial direction than the second slinger.

In an embodiment, the second seal lip may be coupled to the second slinger and protrude from the second slinger in the inner axial direction.

In an embodiment, the slinger may comprise an outer axial end portion formed to be bent in an outer radial direction.

In an embodiment, an undercut may be formed concavely in the inner radial direction in the second outer peripheral surface adjacent to the first end surface.

Advantageous Effects

According to a wheel bearing according an embodiment, the wheel bearing can seal between a wheel hub and a constant velocity joint and prevent an inner ring from being exposed to the external environment. Therefore, it is possible to improve the durability of the wheel bearing by preventing the occurrence of stress corrosion cracks in the inner ring in advance.

EXPLANATION OF REFERENCE NUMERALS

Figure 1:
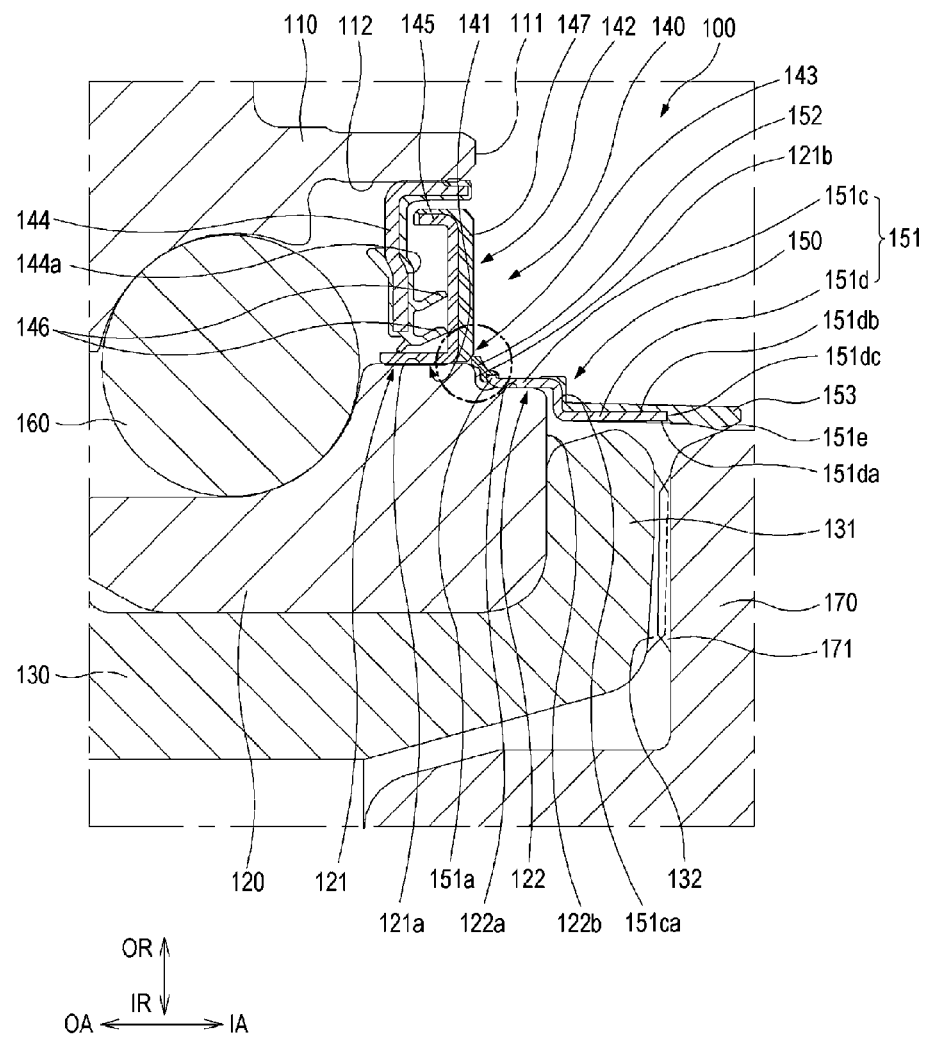
FIG. 1 is a cross-sectional view showing a wheel bearing according an embodiment of the present disclosure.

100: wheel bearing, 110: outer ring, 111: end surface, 112: inner peripheral surface, 120: inner ring, 121: first cylindrical portion, 121a: first outer peripheral surface, 121b: first end surface, 121c: first corner surface, 122: second cylindrical portion, 122a: second outer peripheral surface, 122b: second end surface, 122c: undercut, 130: wheel hub, 131: orbital forming portion, 132: wheel hub spline, 140: first seal member, 141: inner peripheral surface, 142: end surface, 143: corner surface, 144: outer frame, 144a: end surface, 145: inner frame, 145a: inner peripheral surface, 145b: end surface, 145c: corner surface, 146: outer seal lip, 147: encoder, 147a: inner peripheral surface, 147b: end surface, 147c: corner surface, 150: second seal member, 151: slinger, 151a: outer axial end portion, 151c: first slinger, 151ca: slinger end surface, 151d: second slinger, 151da: inner peripheral surface, 151db: outer peripheral surface, 151dc: end surface, 151e: protrusion, 152: first seal lip, 152a, 252a, 352a, 452a, 552a: first seal portion, 152b, 252b, 352b: second seal portion, 152c: concave portion, 153: second seal lip, 160: rolling element, 170: constant velocity joint, 171: constant velocity joint spline

DETAILED DESCRIPTION

Embodiments of the present disclosure are exemplified for the purpose of explaining the technical spirit of the present disclosure. The scope of rights according to the present disclosure is not limited to the embodiments presented below or detailed descriptions of these embodiments.

Unless otherwise defined, all technical and scientific terms used in the present disclosure have the meanings commonly understood by one of ordinary skill in the art to which the present disclosure belongs. All terms used in the present disclosure are selected for the purpose of more clearly describing the present disclosure and not to limit the scope of the present disclosure.

Unless the phrase or sentence clearly indicates otherwise, terms "comprising," "including," "having," "taking," and the like used herein should be construed as open-ended terms encompassing the possibility of including other embodiments.

Expressions in the singular described in the present disclosure may include the meaning of the plural unless the context clearly dictates otherwise, and the same is equally applied to the singular form set forth in the claims.

Expressions such as the terms "first" and "second" used in the present disclosure are used to distinguish a plurality of constituent elements from each other, and do not limit the order or importance of the constituent elements.

The direction indicating term "outer radial direction" used in the present disclosure means a direction away from an axis of a rotating body among radial directions with respect to the axis, and the direction indicating term "inner radial direction" means the opposite direction to the outer radial direction. Further, the direction indicating terms such as an "outer axial direction," "outer," or the like used in the present disclosure mean a direction from the inside of a chassis to a wheel along an axis of a rotating body, and the direction indicating terms such as an "inner axial direction," "inner," or the like mean a direction from a wheel to the inside of a chassis along an axis of a rotating body.

Embodiments of the present disclosure will be described below with reference to the accompanying drawings. In the accompanying drawings, the same or corresponding constituent elements are denoted by the same reference numerals. Further, in the descriptions of the embodiments below, duplicate descriptions of the same or corresponding components may be omitted. However, even though the description of a component is omitted, such a component is not intended to be excluded in any embodiment.

Figure 2:
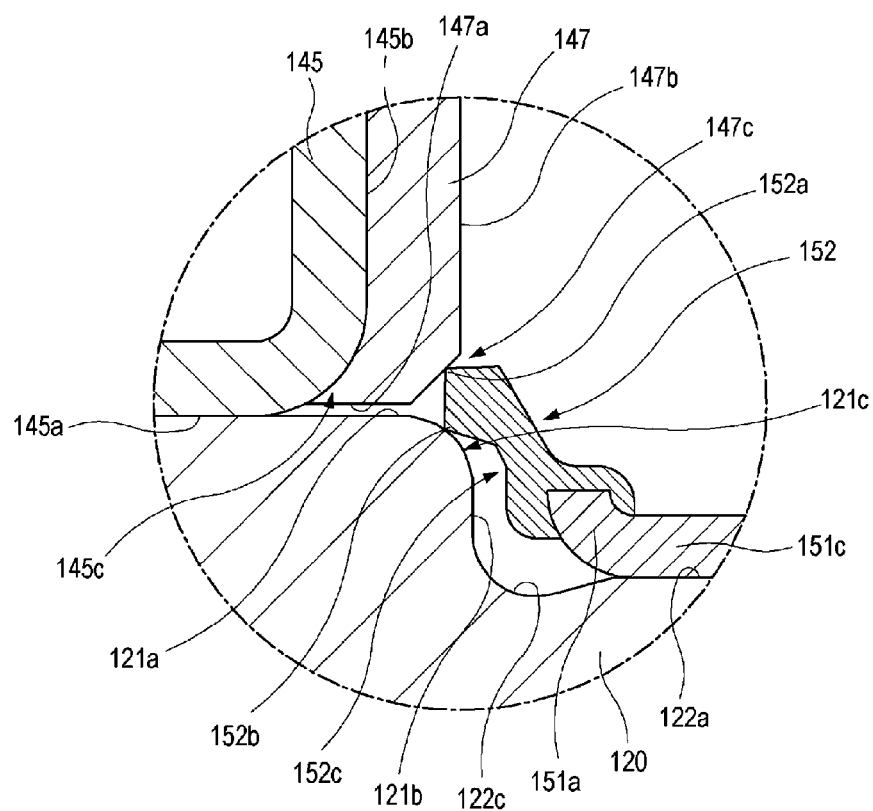
FIG. 2 is a partially enlarged view of FIG. 1.

FIG. 1 is a cross-sectional view showing a wheel bearing according to an embodiment of the present disclosure. FIG. 2 is a partially enlarged view of FIG. 1.

As shown in FIG. 1, a wheel bearing 100 according to an embodiment of the present disclosure comprises an outer ring 110, an inner ring 120, a wheel hub 130, a first seal member 140, and a second seal member 150.

The outer ring 110 is coupled to a vehicle body (that is, a chassis or a knuckle of a vehicle). The outer ring 110 is made of a metal material and has a hollow cylindrical shape.

The inner ring 120 is coupled to the wheel hub 130 and is disposed to be spaced apart from the outer ring 110 in an inner radial direction IR. The inner ring 120 is made of a metal material and has a hollow cylindrical shape. The inner ring 120 is configured to rotate relative to the outer ring 110. For smooth relative rotation between the outer ring 110 and the inner ring 120, a plurality of rolling elements 160 are disposed between the outer ring 110 and the inner ring 120. The rolling elements 160 may be made of a metal material and may be formed of balls or rollers.

The inner ring 120 comprises a first cylindrical portion 121 and a second cylindrical portion 122. The first cylindrical portion 121 comprises a first outer peripheral surface 121a are a first end surface 121b (hereinafter referred to as an "end surface") disposed in an inner axial direction IA of the first outer peripheral surface 121a and form to be perpendicular to the first outer peripheral surface 121a. The second cylindrical portion 122 has a diameter smaller than that of the first cylindrical portion 121. The second cylindrical portion 122 comprises a second outer peripheral surface 122a and a second end surface 122b disposed in the inner axial direction IA of the second outer peripheral surface 122a and formed to be perpendicular to the second outer peripheral surface 122a. The second cylindrical portion 122 extends in the inner axial direction IA from the first end surface 121b. The second outer peripheral surface 122a is located further in the inner radial direction IR than the first outer peripheral surface 121a. The second outer peripheral surface 122a is parallel to the first outer peripheral surface 121a. A wheel speed sensor which detects a rotational speed of a wheel through a target such as an encoder 147 which will be described later may be installed to correspond to a radial position of the encoder 147. Since the second outer peripheral surface 122a is located further in the inner radial direction IR than the first outer peripheral surface 121a, the wheel speed sensor may be disposed deeper in the inner radial direction IR than the first outer peripheral surface 121a. As a result, a sufficient space may be secured for the wheel speed sensor to effectively read (or sense, detect) the target.

The wheel hub 130 comprises an orbital forming portion 131 in the inner axial direction IA of the first end surface 121b. The inner ring 120 is coupled to the wheel hub 130 by the orbital forming portion 131. The orbital forming portion 131 is in contact with the second end surface 122b. Orbital forming refers to a process which is performed by plastically deforming an inner axial end portion of the wheel hub 130 to the outer radial direction in a state in which the inner ring 120 is press-fitted to the wheel hub 130 to fix the inner ring 120 to the wheel hub 130. In this process, since a pressing force for plastically deforming the wheel hub 130 is transmitted to the inner ring 120, a constant hoof stress is generated in the inner ring 120. The wheel hub 130 is configured to be coupled to the wheel in an outer axial direction OA and coupled to a constant velocity joint 170 in the inner axial direction IA. The wheel hub 130 and the constant velocity joint 170 are configured to be face spline-coupled. To this end, wheel hub splines 132 which protrude in the inner axial direction IA and are alternately arranged in the circumferential direction are formed on the wheel hub 130. Further, constant velocity joint splines 171 which protrude in the outer axial direction OA and are alternately arranged in the circumferential direction are formed on the constant velocity joint 170. The wheel hub splines 132 and the constant velocity joint splines 171 are complementarily engaged with each other. Accordingly, a driving force from the constant velocity joint 170 is transmitted to the wheel hub 130. As a result, the wheel hub 130 rotates relative to the outer ring 110 together with the inner ring 120, the constant velocity joint 170, and the wheel.

The first seal member 140 is disposed between the outer ring 110 and the first outer peripheral surface 121a of the first cylindrical portion 121 and seals between the outer ring 110 and the inner ring 120. Since the inner ring 120 is configured to rotate relative to the outer ring 110, the first seal member 140 is a kind of a dynamic seal.

In an embodiment, the first seal member 140 may comprise an inner peripheral surface 141 disposed on the first outer peripheral surface 121a of the first cylindrical portion 121, an end surface 142 formed at an end portion in the inner axial direction IA, and a corner surface 143 disposed between the inner peripheral surface 141 and the end surface 142 of the first seal member 140. It can be understood that the inner peripheral surface 141 of the first seal member 140 is an inner peripheral surface 145a of an inner frame 145 which will be described later or an inner peripheral surface 147a of the encoder 147 which will be described later. It can be understood that the end surface 142 of the first seal member 140 is an end surface 145b of the inner frame 145 which will be described later or an end surface 147b of the encoder 147 which will be described later. The end surface 142 of the first seal member 140 may be disposed to form the same plane as the first end surface 121b of the first cylindrical portion 121. Further, the end surface 142 of the first seal member 140 may be disposed to form the same plane as an end surface 111 of the outer ring 110. The corner surface 143 of the first seal member 140 may be formed by rounding or chamfering a corner in which the inner peripheral surface 141 and the end surface 142 of the first seal member 140 meet.

The second seal member 150 is press-fitted to the second cylindrical portion 122 of the inner ring 120. Since the constant velocity joint 170 is configured to rotate together with the inner ring 120 without rotating relative to the inner ring 120, the second seal member 150 is a kind of a static seal. The second seal member 150 comprises a slinger 151, a first seal lip 152, and a second seal lip 153.

The slinger 151 is a portion which is press-fitted to the second cylindrical portion 122 of the inner ring 120 and forms an overall skeleton of the second seal member 150. The slinger 151 comprises an outer axial end portion 151a which is spaced apart from the first seal member 140 and the first end surface 121b. The slinger 151 is spaced apart from the first seal member 140 in the inner radial direction IR and is spaced apart from the first end surface 121b of the first cylindrical portion 121 in the inner axial direction IA. The slinger 151 is made of a metal material.

In an embodiment, as shown in FIG. 2, the outer axial end portion 151a of the slinger 151 may be formed to be bent in an outer radial direction OR. The outer axial end portion 151a protrudes from a first slinger 151c in the outer radial direction OR. Thus, the slinger 151 may be easily inserted to the second cylindrical portion 122 of the inner ring 120. Further, since a contact area between the first seal lip 152 and the slinger 151 increases, a coupling force between the first seal lip 152 and the slinger 151 may increase.

The first seal lip 152 is coupled to the outer axial end portion 151a of the slinger 151, and comprises a first seal portion 152a in contact with a portion of the first seal member 140 and a second seal portion 152b in contact with a portion of the first cylindrical portion 121. The first seal lip 152 is disposed between the outer axial end portion 151a of the slinger 151 and the first seal member 140 and seals between the slinger 151 and the first seal member 140. Further, the first seal lip 152 is disposed between the outer axial end portion 151a of the slinger 151 and the first cylindrical portion 121 of the inner ring 120 and seals between the slinger 151 and the first cylindrical portion 121 of the inner ring 120. Among the portions in which the inner ring 120 can be exposed to the outside, the first cylindrical portion 121 is sealed by the first seal lip 152 and the second cylindrical portion 122 is sealed by the slinger 151. Therefore, it is possible to prevent stress corrosion cracks (SCC) generated due to the inner ring 120 which is exposed to the outside. As a result, it is possible to improve the durability of the wheel bearing 100. In addition, due to the first seal lip 152 in contact with a portion of the first seal member 140 and a portion of the first cylindrical portion 121, it is possible to double block foreign matters from being introduced to the inner ring 120 from the outside. Thus, it is possible to further improve the sealing performance of the second seal member 150.

The second seal lip 153 is coupled to the slinger 151 to be spaced apart from the first seal lip 152 in the inner axial direction IA. The second seal lip 153 seals between the wheel hub 130 and the constant velocity joint 170. Thus, the second seal lip 153 prevents the wheel hub 130 or the constant velocity joint 170 from being worn or corroded due to an introduction of foreign matters between the wheel hub 130 and the constant velocity joint 170. In this way, since the second seal member 150 comprises the first seal lip 152 and the second seal lip 153, the second seal member 150 may prevent foreign matters from being introduced to the inner ring 120 as well as between the wheel hub 130 and the constant velocity joint 170 from the outside. The first seal lip 152 and the second seal lip 153 may be made of a rubber material and may be formed to have a predetermined shape through vulcanization. The first seal portion 152a may be in contact with at least one of the inner peripheral surface 141 of the first seal member 140, the end surface 142 of the first seal member 140, and the corner surface 143 of the first seal member 140. According to an embodiment, the first seal portion 152a may be configured to be in contact with any one of the inner peripheral surface 141, the end surface 142, and the corner surface 143 of the first seal member 140. For example, as shown in FIG. 2, the first seal portion 152a may be in contact with the corner surface 143 of the first seal member 140. According to another embodiment, the first seal portion 152a may be configured to be in contact with a combination of two or more of the inner peripheral surface 141, the end surface 142, and the corner surface 143.

In an embodiment, as shown in FIG. 2, the second seal portion 152b may be in contact with at least one of the first outer peripheral surface 121a of the first cylindrical portion 121, the first end surface 121b of the first cylindrical portion 121, and a first corner surface 121c disposed between the first outer peripheral surface 121a of the first cylindrical portion 121 and the first end surface 121b of the first cylindrical portion 121. The first corner surface 121c of the first cylindrical portion 121 may be formed by rounding or chamfering a corner in which the first outer peripheral surface 121a and the first end surface 121b meet. For example, as shown in FIG. 2, the second seal portion 152b may be configured to be in contact with the first corner surface 121c of the first cylindrical portion 121.

Figure 3:
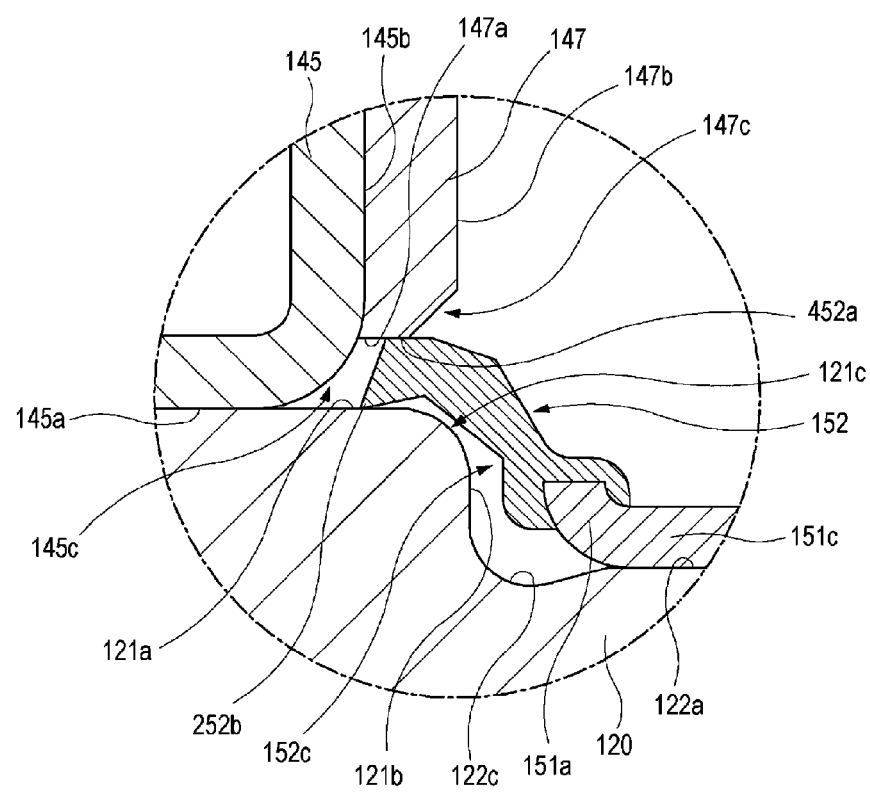
FIG. 3 is a cross-sectional view showing another embodiment of first and second seal members shown in FIG. 2.

FIG. 3 is a cross-sectional view showing another embodiment of the first and second seal members shown in FIG. 2.

As another embodiment, as shown in FIG. 3, a first seal portion 452a may be configured to be in contact with an inner peripheral surface 147a of an encoder 147. A second seal portion 252b may be configured to be in contact with a first outer peripheral surface 121a of a first cylindrical portion 121. A gap between the encoder 147 and the first outer peripheral surface 121a shown in FIG. 3 may be formed larger than a gap between the encoder 147 and the first outer peripheral surface 121a shown in FIG. 2. Even when the gap between the encoder 147 and the first outer peripheral surface 121a is large, it is possible to prevent foreign matters from being introduced into an inner frame 145 and a first cylindrical portion 121 by the first seal portion 452a and the second seal portion 252b.

Figure 4:
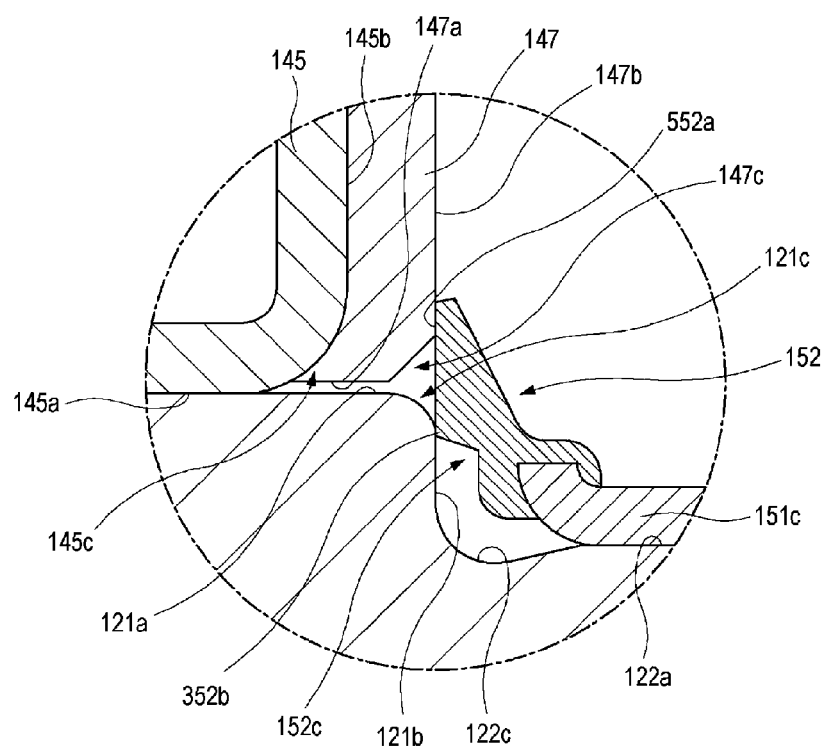
FIG. 4 is a cross-sectional view showing still another embodiment of the second seal member shown in FIG. 2.

FIG. 4 is a cross-sectional view showing still another embodiment of the second seal member shown in FIG. 2.

As still another embodiment, as shown in FIG. 4, a first seal portion 552a may be configured to be in contact with an end surface 147b of an encoder 147. A second seal portion 352b may be configured to be in contact with a first end surface 121b of a first cylindrical portion 121. Since a structure of a first seal lip 152 comprising the first seal portion 552a and the second seal portion 352b is simple due to such a configuration, it is possible to easily produce the first seal lip 152. As still another embodiment, the first seal portion may be configured to be in contact with a combination of two or more of an inner peripheral surface 147a, an end surface 147b, and a corner surface 147c of the encoder 147. A second seal portion may be configured to be in contact with a combination of two or more of a first outer peripheral surface 121a, a first end surface 121b, and a first corner surface 121c of the first cylindrical portion 121.

In an embodiment, a first seal member 140 may comprise an outer frame 144, an inner frame 145, and an outer seal lip 146. The outer frame 144 is press-fitted to an inner peripheral surface 112 of an outer ring 110 and is coupled to the outer ring 110. The outer frame 144 may be made of a metal material and have an approximately L-shaped cross-sectional shape. The inner frame 145 is disposed spaced apart from the outer frame 144 in the inner axial direction IA. The inner frame 145 is press-fitted and coupled to a first cylindrical portion 121 of an inner ring 120. That is, the inner frame 145 is disposed on a first outer peripheral surface 121a of the first cylindrical portion 121. The inner frame 145 may be made of a metal material and have an approximately C-shaped cross-sectional shape. The outer seal lip 146 is coupled to an end surface 144a formed on the outer frame 144 in the inner axial direction IA and is in contact with the inner frame 145. A plurality of outer seal lips 146 may be provided and may be in contact with a plurality of points of the inner frame 145. The outer seal lip 146 may be made of a rubber material and may be produced in a predetermined shape through vulcanization.

In an embodiment, the first seal member 140 may further comprise the encoder 147 coupled to the inner axial end portion of the inner frame 145. The encoder 147 may comprise the inner peripheral surface 147a which is spaced apart from the first outer peripheral surface 121a of the first cylindrical portion 121 in the outer radial direction OR, the end surface 147b formed in the inner axial direction IA, and the corner surface 147c disposed between the inner peripheral surface 147a and the end surface 147b of the encoder 147. In the encoder 147, the corner surface 147c may be formed by rounding or chamfering the corner in which the inner peripheral surface 147a and the end surface 147b meet.

The first seal portion 152a may be in contact with at least of the inner peripheral surface 147a of the encoder 147, the end surface 147b of the encoder 147, and the corner surface 147c of the encoder 147. For example, as shown in FIG. 2, the first seal portion 152a may be configured to be in contact with the corner surface 147c of the encoder 147.

In an embodiment, a concave portion 152c may be formed in an inner peripheral surface of the first seal lip 152. When the concave portion 152c is formed in the first seal lip 152, a predetermined elastic force may be provided so that the first seal portion 152a and the second seal portion 152b are in elastic contact with the first seal member 140 and the first cylindrical portion 121. Further, since the first seal lip 152 is prevented from interfering with the first cylindrical portion 121 by the concave portion 152c, it is possible to secure a sufficient space for the wheel speed sensor to effectively read the target.

In an embodiment, the slinger 151 may be a hollow cylindrical shape. In an embodiment, the slinger 151 may comprise the first slinger 151c and the second slinger 151d. The first slinger 151c comprise a slinger end surface 151ca formed at the end portion in the inner axial direction IA and is press-fitted to the second cylindrical portion 122 of the inner ring 120. The second slinger 151d has a diameter smaller than that of the first slinger 151c and extends from the slinger end surface 151ca of the first slinger 151c in the inner axial direction IA. Since the second slinger 151d has a diameter smaller than that of the first slinger 151c, the second slinger 151d may be disposed more adjacent to the orbital forming portion 131 and the constant velocity joint 170. As a result, the second seal lip 153 coupled to the second slinger 151d may improve the sealing performance between the wheel hub 130 and the constant velocity joint 170.

In an embodiment, the second seal lip 153 may comprise a protrusion 151e which is coupled to the second slinger 151d and further protrudes in the inner radial direction IR than the second slinger 151d. The protrusion 151e is in contact with the constant velocity joint 170. The protrusion 151e is formed at a position which is spaced apart from the second slinger 151d in the inner axial direction IA.

In an embodiment, the second seal lip 153 is coupled to the second slinger 151d and protrudes from the second slinger 151d in the inner axial direction IA. Thus, an elastic force may be provided to a portion (for example, the protrusion 151e) in which the second seal lip 153 is in contact with the constant velocity joint 170 so that the second seal lip 153 is in elastic contact with the constant velocity joint 170. The second seal lip 153 may be provided on the second slinger 151d to surround the inner peripheral surface 151da, an outer peripheral surface 151db, and an end surface 151dc of the second slinger 151d. Accordingly, since a contact area between the second seal lip 153 and the second slinger 151d increases, it is possible to increase a coupling force between the second seal lip 153 and the slinger 151. Further, as shown in FIG. 1, the second seal lip 153 may be provided on the first slinger 151c and the second slinger 151d to surround the slinger end surface 151ca of the first slinger 151c, the inner peripheral surface 151da, an outer peripheral surface 151db, and an end surface 151dc of the second slinger 151d. Accordingly, since the second seal lip 153 is also in further contact with the slinger end surface 151ca of the first slinger 151c, it is possible to further improve a coupling force between the second seal lip 153 and the slinger 151.

In an embodiment, an undercut 122c may be concavely formed in the inner radial direction IR in the second outer peripheral surface 122a adjacent to the first end surface 121b. The undercut 122c prevents the first seal lip 152 from interfering with the second outer peripheral surface 122a in the process of press-fitting the slinger 151 having the first seal lip 152 formed thereon to the second cylindrical portion 122. Thus, after the slinger 151 is press-fitted to the second cylindrical portion 122, the first seal lip 152 may be in precise contact with a predetermined portion of the first seal member 140 and/or the first cylindrical portion 121. As a result, it is possible to improve the sealing performance of the first seal lip 152.

Figure 5:
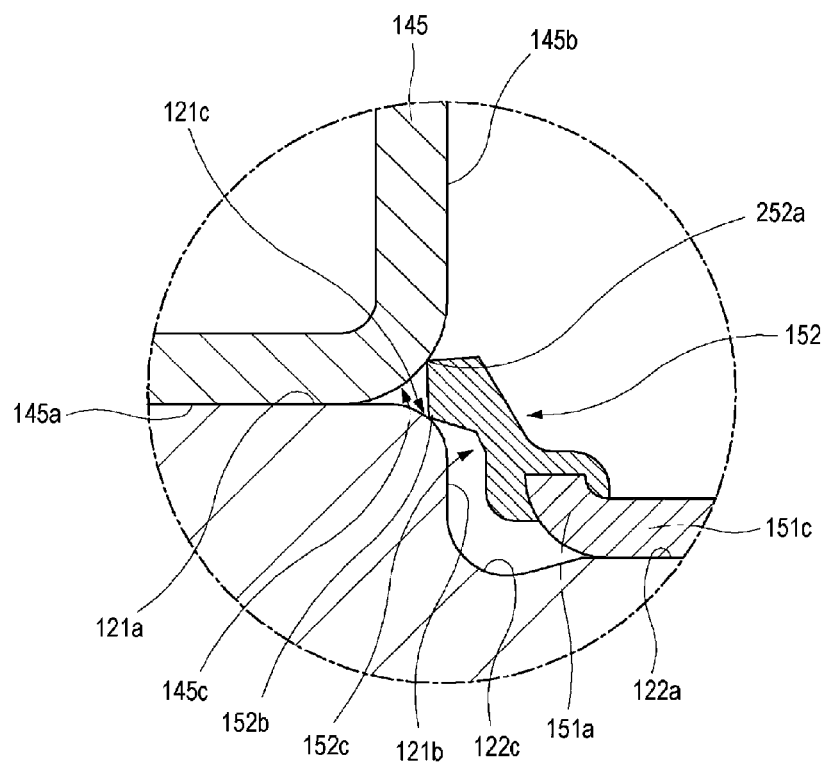
FIG. 5 is a cross-sectional view showing still another embodiment of the first and second seal members shown in FIG. 2.

FIG. 5 is a cross-sectional view showing yet another embodiment of the first and second seal members shown in FIG. 2.

In an embodiment, as shown in FIG. 5, an inner frame 145 may has an inner peripheral surface 145a in contact with a first outer peripheral surface 121a of the first cylindrical portion 121, an end surface 145b formed on an end portion in the inner axial direction IA, and a corner surface 145c disposed between an inner peripheral surface 145a of an inner frame 145 and an end surface 145b of an inner frame 145. The corner surface 145c may be formed by rounding or chamfering a corner in which the inner peripheral surface 145a and the end surface 145b meet. For example, a first seal portion 252a may be configured to be in contact with the corner surface 145c. In the embodiment shown in FIG. 5, the end surface 145b of the inner frame 145 may be disposed to form the same plane as a first end surface 121b of a first cylindrical portion 121.

Figure 6:
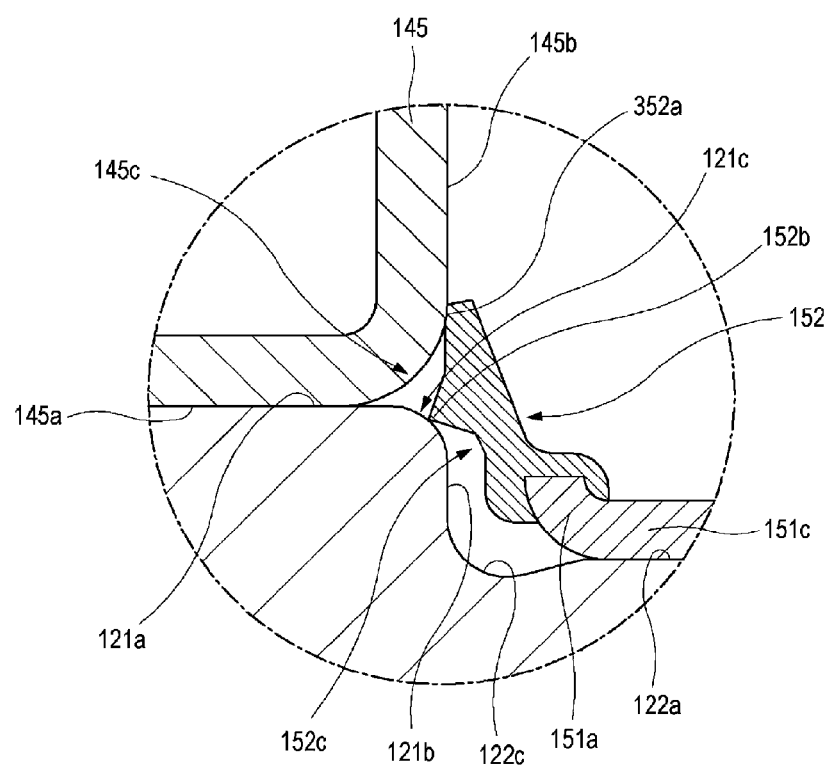
FIG. 6 is a cross-sectional view showing yet another embodiment of the first and second seal members shown in FIG. 2.

FIG. 6 is a cross-sectional view showing yet another embodiment of the first and second seal members shown in FIG. 2.

As yet another embodiment, as shown in FIG. 6, a first seal portion 352a may be configured to be in contact with an end surface 145b of an inner frame 145. In the embodiment shown in FIG. 6, the end surface 145b of the inner frame 145 may be disposed to form the same plane as a first end surface 121b of a first cylindrical portion 121.

Although the technical spirit of the present disclosure has been described above by the examples shown in some embodiments and the accompanying drawings, it should be understood that various substitutions, modifications, and alterations are possible without departing from the technical spirit and scope of the present disclosure that can be understood by those of ordinary skill in the art to which the present disclosure belongs. Further, such substitutions, modifications, and alterations are intended to fall within the scope of the appended claims.

What is claimed is:

1. A wheel bearing, comprising:
an outer ring coupled to a vehicle body;
a wheel hub to which a wheel is coupled, in which an orbital forming portion is formed at an end portion thereof in an inner axial direction, and in which face splines are formed at an inner axial end portion of the orbital forming portion;
an inner ring which is coupled to an outer peripheral surface of the wheel hub by the orbital forming portion to rotate relative to the outer ring, and which comprises a first cylindrical portion comprising a first outer peripheral surface and a first end surface formed in the inner axial direction and a second cylindrical portion having a diameter smaller than that of the first cylindrical portion, comprising a second outer peripheral surface and a second end surface formed in the inner axial direction, and extending from the first end surface in the inner axial direction;

a first seal member disposed between the outer ring and the first outer peripheral surface of the first cylindrical portion and configured to seal between the outer ring and the inner ring; and a second seal member press-fitted to the second cylindrical portion, wherein the second seal member comprises:

a slinger comprising an outer axial end portion spaced apart from the first seal member and the first end surface;

a first seal lip coupled to the outer axial end portion of the slinger and comprising a first seal portion in contact with a portion of the first seal member and a second seal portion in contact with a portion of the first cylindrical portion;

a second seal lip coupled to the slinger so as to be spaced apart from the first seal lip in the inner axial direction, wherein the first seal member comprises an inner peripheral surface disposed on a first outer peripheral surface of the first cylindrical portion, an end surface formed in the inner axial direction, and a corner surface disposed between the inner peripheral surface of the first seal member and the end surface of the first seal member;

wherein the first seal portion is in contact with the inner peripheral surface of the first seal member or the corner surface disposed between the inner peripheral surface of the first seal member and the end surface of the first seal member; and wherein the second seal portion is in contact with the first outer peripheral surface of the inner ring or a corner surface disposed between the first outer peripheral surface and the first end surface of the inner ring.

2. The wheel bearing of claim 1, wherein the first seal member comprises:

an outer frame coupled to the outer ring;

an inner frame coupled to the first cylindrical portion of the inner ring so as to be spaced apart from the outer frame in the inner axial direction; and an outer seal lip coupled to the outer frame and in contact with the inner frame.

3. The wheel bearing of claim 2, wherein the inner frame comprise an inner peripheral surface in contact with the first outer peripheral surface of the first cylindrical portion; an end surface formed in the inner axial direction, and a corner surface disposed between the inner peripheral surface of the inner frame and the end surface of the inner frame, and wherein the first seal portion is in contact with the inner peripheral surface of the inner frame or the corner surface of the inner frame.

4. The wheel bearing of claim 2, wherein the first seal member further comprises an encoder coupled in the inner axial direction of the inner frame.

5. The wheel bearing of claim 4, wherein the encoder comprises an inner peripheral surface spaced apart from the first outer peripheral surface of the first cylindrical portion in an outer radial direction; an end surface formed in the inner axial direction; and a corner surface disposed between the inner peripheral surface of the encoder and the end surface of the encoder, and wherein the first seal portion is in contact with the inner peripheral surface of the encoder, or the corner surface of the encoder.

6. The wheel bearing of claim 1, wherein a concave portion is formed in the inner peripheral surface of the first seal lip so that the first seal lip is in elastic contact with the first seal member and the first cylindrical portion.

7. The wheel bearing of claim 1, wherein the slinger is press-fitted to the second cylindrical portion and is spaced apart from the orbital forming portion.

8. The wheel bearing of claim 7, wherein the slinger comprises:

a first slinger comprising a slinger end surface formed in the inner axial direction and press-fitted to the second cylindrical portion; and a second slinger having a diameter smaller than that of the first slinger and extending from the slinger end surface in the inner axial direction.

9. The wheel bearing of claim 8, wherein the second slinger is spaced apart from the orbital forming portion in an outer radial direction.

10. The wheel bearing of claim 8, wherein the second seal lip is coupled to the second slinger and comprises a protrusion which further protrudes in an inner radial direction than the second slinger.

11. The wheel bearing of claim 8, wherein the second seal lip is coupled to the second slinger and protrudes from the second slinger in the inner axial direction.

12. The wheel bearing of claim 1, wherein the slinger comprises an outer axial end portion formed to be bent in an outer radial direction.

13. The wheel bearing of claim 1, wherein an undercut is formed concavely in an inner radial direction in the second outer peripheral surface adjacent to the first end surface.

* * * * *